(12) United States Patent
Landry, Sr.

(10) Patent No.: US 7,160,467 B2
(45) Date of Patent: Jan. 9, 2007

(54) OIL-WATER SEPARATOR

(76) Inventor: Rene James Landry, Sr., 9600 Longside Rd., New Iberia, LA (US) 70560

( * ) Notice: Subject to any disclaimer, the term of this patent is extended or adjusted under 35 U.S.C. 154(b) by 0 days.

(21) Appl. No.: 10/999,543

(22) Filed: Nov. 30, 2004

(65) Prior Publication Data

US 2006/0113253 A1 Jun. 1, 2006

(51) Int. Cl.
*C02F 1/28* (2006.01)
*E02B 15/04* (2006.01)

(52) U.S. Cl. ...................... 210/691; 210/747

(58) Field of Classification Search ............. 210/691, 210/693, 747, 170, 242.4, 266, 282, 416.1, 210/924
See application file for complete search history.

(56) References Cited

U.S. PATENT DOCUMENTS

| | | | |
|---|---|---|---|
| 3,872,007 A * | 3/1975 | Holland ............ 210/170 |
| 4,130,489 A * | 12/1978 | Black ............ 210/242.4 |
| 5,531,902 A * | 7/1996 | Gallup ............ 210/673 |
| 6,838,006 B1 * | 1/2005 | Feierabend et al. ...... 210/739 |
| 2004/0226869 A1 * | 11/2004 | McClure et al. ............ 210/163 |
| 2005/0072738 A1 * | 4/2005 | Weir ............ 210/691 |

* cited by examiner

*Primary Examiner*—Ivars C. Cintins
(74) *Attorney, Agent, or Firm*—Keaty Professional Law Corporation

(57) ABSTRACT

An oil-water separator for use in a trench, which surrounds an oilfield. The separator is positioned in the ground such that an inlet conduit extends at about the same level as the bottom of the trench. The trench water is admitted into the housing, where it contacts a plurality of buoyant oil-absorbing members, causing the oil particles to adhere to the surface of the oil-absorbing members. An outlet conduit located downstream from the oil-absorbing members is connectable to a pump to cause the oil-free water to be pumped from the housing and diverted away from the trench.

4 Claims, 3 Drawing Sheets

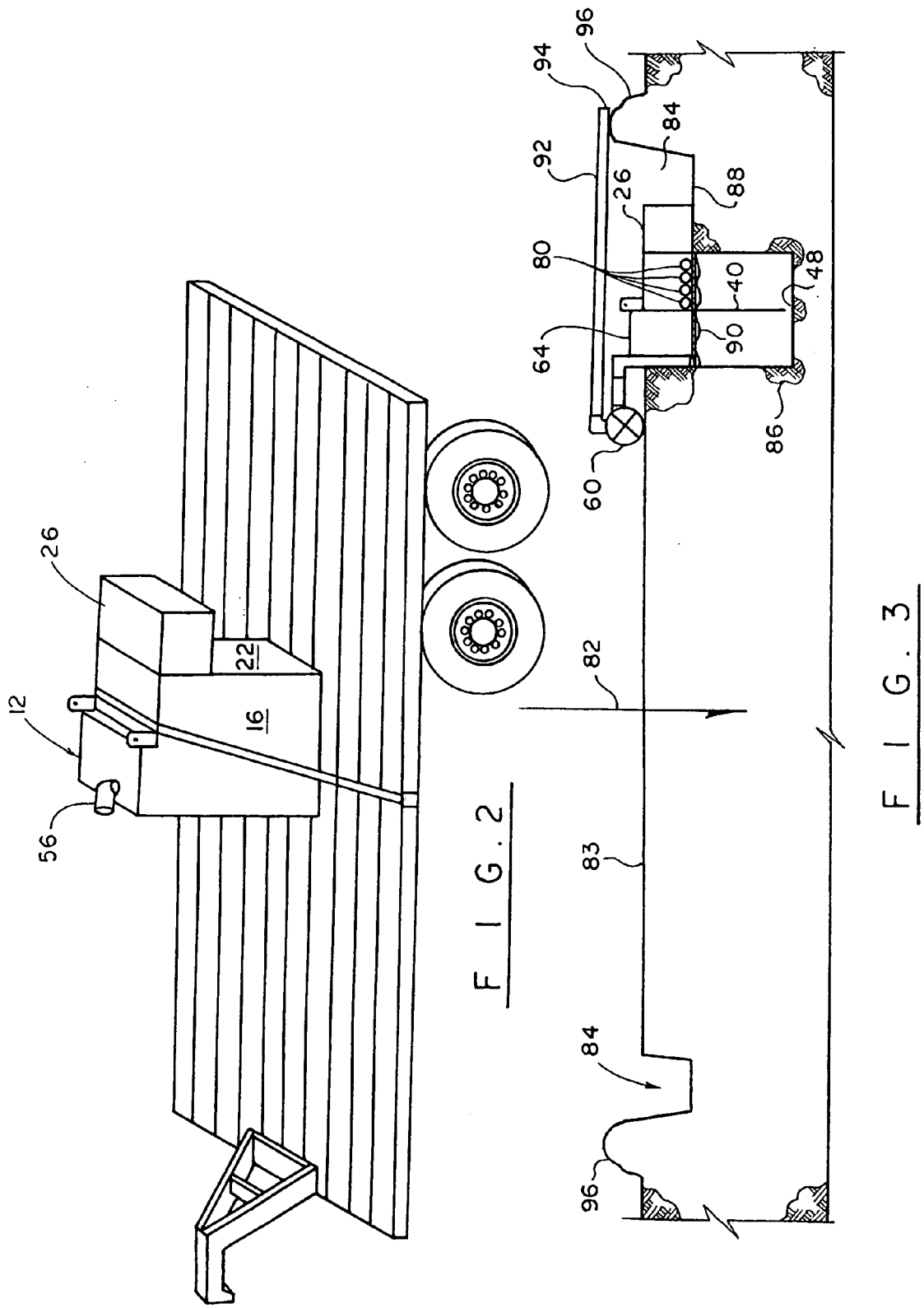

OIL-WATER SEPARATOR

BACKGROUND OF THE INVENTION

The present invention relates to oilfield equipment, and more particularly to an apparatus for separating water and oil that can be use in-situ.

Conventionally, an oil well is encompassed with a water-retaining moat, or ditch designed to rain water washed away from the area surrounding the drilling or production rig. The ditch is formed about the periphery of a zone defined by the governmental regulations for the protection of the environment. When small amounts of oil escape from the well bore or are spilled by trucks, the rain water tends to carry the oil droplets, along with the rain water into the ditch, wherein the oil-water mixture is retained. A levee is constructed on the outer edge of the ditch to prevent the water from the ditch escaping outside of the defined zone.

Despite all efforts, heavy rains and sometimes flood waters fill the ditch to capacity and cause the water mixed with the suspended oil to flow over the levee, thereby contaminating the surrounding area. From time to time, the ditch is inspected to make sure that the level of liquids in the trench has not exceeded the allowable value. A part of the ditch is made intentionally at a lower level to created the so-called sump. Even the best inspections may miss a critical increase in the liquid level within the sump, which may quickly fill to capacity and overflow if not carefully monitored. From time to time, the water with suspended oil particles is pumped out and transported away from the site to a de-contamination facility, where the oil may be recovered. Naturally, such transportation increases the cost of the oilfield operation.

The present invention contemplates provision of an oil-water separator that can be installed in the trench surrounding the oil well to capture oil and prevent it from being carried over the levee by rising water.

SUMMARY OF THE INVENTION

It is, therefore, an object of the present invention to provide an in situ apparatus for separating oil from water that can be installed in an oilfield ditch.

It is another object of the present invention to provide an oil-water separator that has oil-absorbing means for retaining a quantity of oil within the apparatus, thereby preventing escape of the oil and contamination of the surrounding areas.

These and other objects of the present invention are achieved through a provision of an oil-water separator that is adapted for positioning in the ground next to the trench surrounding an oilfield. A portion of the separator housing is buried below the trench bottom, while the inlet conduit is positioned at about the same level as the trench bottom.

A plurality of buoyant oil-absorbing members are positioned in the housing; the trench water with oil particles suspended therein is admitted through the inlet conduit. The oil particles contact the oil-absorbing members and adhere thereto. An outlet conduit is positioned downstream from the oil-absorbing members. The outlet conduit is connectable to a pump to allow removal of the oil-free trench water from the housing. A diverting pipe coupled to the outlet of the pump diverts the water away from the housing and the trench. The water can be diverted over the levee surrounding the trench or to other desired location. As a result the oil is removed from the trench water, and the level of liquid in the trench is controlled.

BRIEF DESCRIPTION OF THE DRAWINGS

Reference will now be made to the drawings, wherein like parts are designated by like numerals and wherein

FIG. 2 is a perspective view of the oil-water separator apparatus in accordance with the present invention transported to or from the job site.

FIG. 3 is a schematic view of the separator apparatus in accordance with the present invention positioned in the trench adjacent an oilfield, with the ditch not having any water.

DETAILED DESCRIPTION OF THE PREFERRED EMBODIMENT

Figure 1:
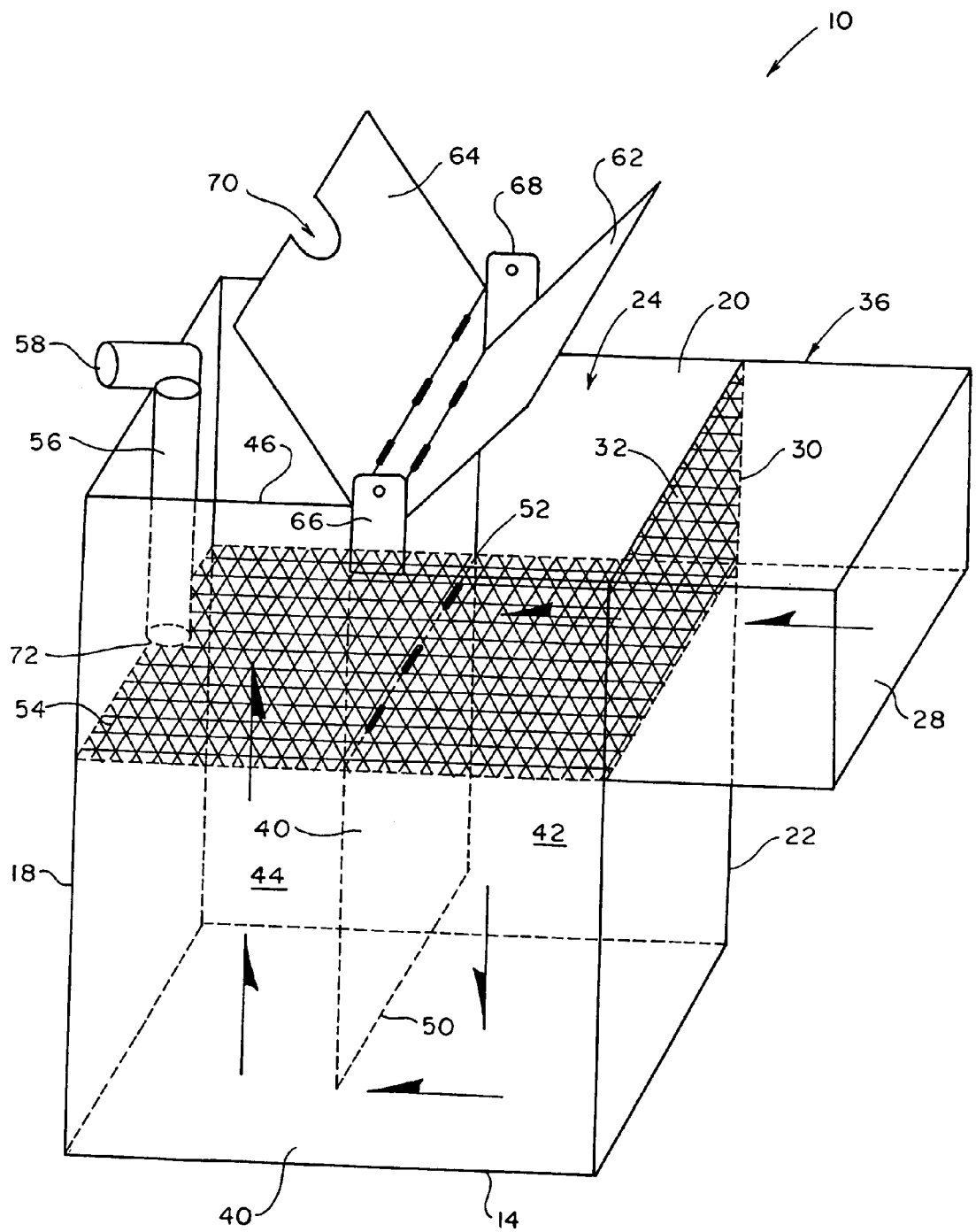
FIG. 1 is a perspective view of the oil-water separator in accordance with the present invention.

Turning now to the drawings in more detail, numeral 10 designates the oil-water separator apparatus in accordance with the present invention. As can be seen in the drawings, the separator 10 comprises a separator housing 12 having a closed bottom 14, vertical front wall 16, back wall 20, a pair of side walls 18 and 22, and an open top 24. The walls 16, 18, 20, and 22 and the bottom 14 define an interior hollow chamber of the housing 12. The side wall 22 is provided with an inlet conduit 26 extending outwardly in a transverse relationship to the vertical wall 22. The inlet conduit 26 has an inlet opening 28 for admitting liquid into the separator housing 12.

An opening 30 is formed in the upper part of the wall 22, and the conduit 26 is positioned therein. The inlet conduit 26 communicates with an interior chamber of the housing 12 through the opening 30. A water-permeable mesh screen 32 is positioned in the opening 30 to prevent floating debris, such as sticks, leaves, and other such undesirable objects from entering the interior chamber of the housing 12.

A vertical dividing plate 40 is positioned inside the housing 12, dividing the interior chamber of the housing into two distinct portions, an inlet portion 42 and an outlet portion 44. The dividing plate 40 is secured and extends from a top edge 46 of the front wall 16 and the back wall 20. The vertical dimensions of the dividing plate 40 are smaller than the height of the vertical walls 16 and 20, such that a channel 48 is formed below a lower edge 50 of the separating plate 40. The horizontal dimensions of the plate 40 are slightly smaller or equal to the distance between the front wall 16 and the back wall 20.

A slot 52 is formed in the plate 40 at a level approximately co-planar with the bottom of the inlet conduit 26. An inner water permeable mesh screen 54 is inserted through the slot 52 to extend substantially across the width of the housing 12, from the side wall 18 to the side wall 22. An outlet conduit 56 is positioned in the outlet portion 44 of the interior chamber to allow removal of liquid from the interior of the housing 12. The outlet conduit 56 has an outlet opening 58. The conduit 56 is operationally connected to a pump 60 to facilitate removal of the liquid form the housing 12. The open top 24 of the housing 12 is protected by a pair of hinged covers 62 and 64 which are secured to extension plates 66, 68, which are mounted on the upper edge of the walls 16 and 20. The securing plates 66 and 68 extend vertically outwardly from the edge 46, allowing pivotal movement of the covers 62 and 64. A cutout 70 is formed in the cover 64 to accommodate extension of the outlet conduit 56 from the chamber portion 44 outside of the housing 12. The bottom, inlet end 72 of the outlet conduit 56 rests on the screen 54, as can be seen in FIG. 1.

The present invention provides for the use of a plurality of oil absorbing members 80, which are positioned in the chamber portion 42 above the screen 54. The absorbent members 80 are formed from porous material suitable for attracting and retaining as much oil particles as possible. The absorbent members 80, which can be two or more in number, are buoyant; they float close to the surface of the liquid inside the chamber portion 42, as will be described in more detail hereinafter.

Figure 4:
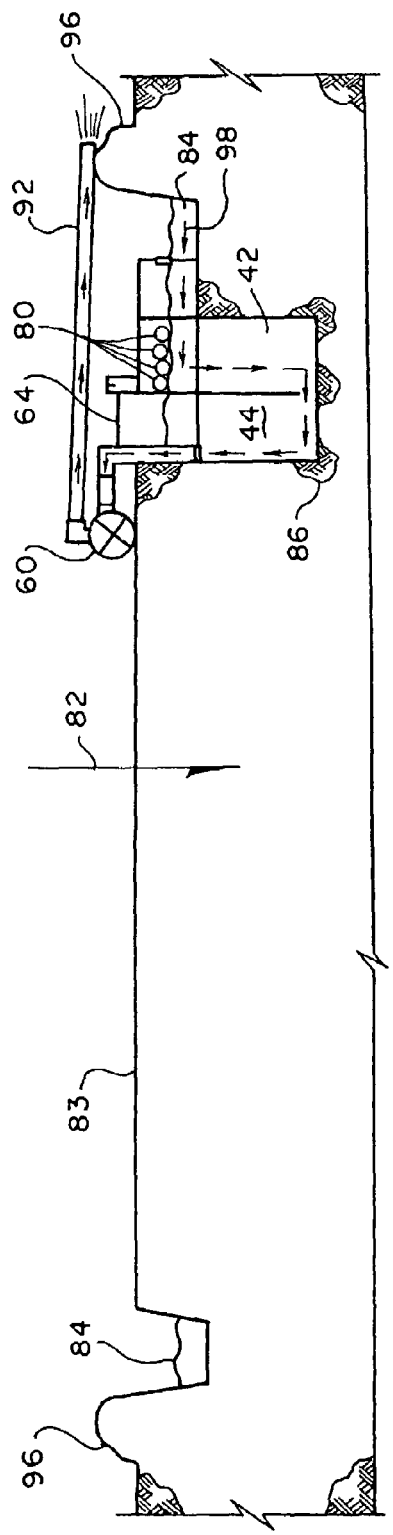
FIG. 4 is a schematic view similar to FIG. 3, with the ditch half full of water.
Figure 5:
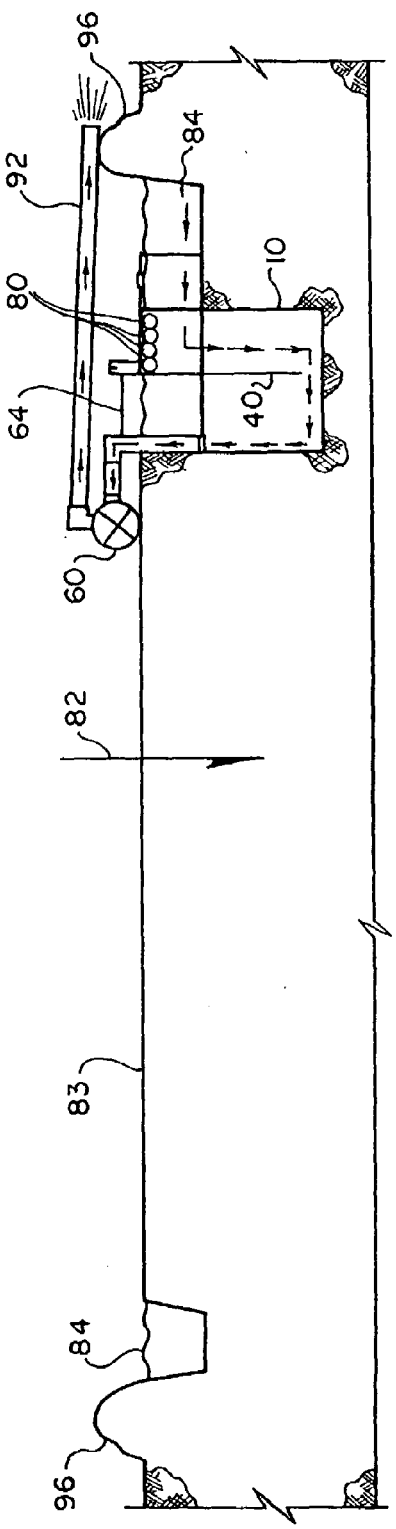
FIG. 5 is a schematic view similar to FIGS. 3 and 4, with the ditch being full of water.

Turning now to FIGS. 3–5, the oil-water separator 10 in accordance with the present invention is seen positioned in an oilfield adjacent an oil well 82. A ditch, or trench, 84 surrounds the oil well 82. The separator 10 is partially buried in the soil wherein a hole 86 has been formed. Most of the separator housing 12 is below the ground level 83. The hole 86 is immediately adjacent to the ditch 84, preferably close to the lowest, sump area of the ditch 84. The inlet conduit 26 is positioned close to the bottom 88 of the ditch 84 so as to receive water through the opening 28.

A certain quantity of water is initially deposited into the housing 12, with the level of preloaded water 90 reaching about the level of the mesh screen 54. The absorbent members 80 rest on the screen 54, initially above the water level 90. The outlet conduit 56 is connected to the pump 60, and the outlet of the pump 60 is connected to a diverting conduit 92. An outlet 94 of the diverting conduit 92 extends above a levee 96 formed around the ditch 84.

Gradually, the rainwater and run-off collect in the ditch 84. When the level of water reaches the inlet conduit 26, the water is allowed to freely enter the conduit 26 and flow into the housing. The direction of the water flow is schematically illustrated by arrows 98. The water, with the oil particles suspended therein enters the inlet portion 42 of the interior chamber. The absorbent members 80 attract the oil particles that tend to float on the water surface. Water, substantially free from the oil particles, floats under the dividing plate 40, along the channel 48 into the chamber portion 44. The liquid level substantially equalizes in the portion 42 and the portion 44 of the interior chamber with the level of water in the trench 84. Any debris that entered the chamber portions 42 and 44 through the screen 32 is additionally screened by the screen 54 on its path upwardly in the chamber portion 44.

The water, now substantially free from oil and debris, enters the outlet conduit 56. When the pump 60 is activated, the water is pumped out of the separator housing 12 and into the diverting conduit 92. From there, the water can be pumped over the levee 96. When the ditch 84 becomes full with water, as schematically shown in FIG. 5, the pump 60 may be turned on either manually or automatically, to be activated based on the water level predetermined by the operator. The water is pumped from the ditch 84 through the separator 10 and over the levee 96, thereby preventing oil accumulated in the ditch 84 from being released into the surrounding areas outside of the levee 96.

If desired, the level of water in the ditch 84 can be continuously monitored and controlled by the automatic operation of the pump 60. In the alternative, an operator may inspect the level of liquid in the ditch 84 and start operation of the pump 60 to remove a portion of water from the ditch 84. From time to time, the operator can inspect the status of the absorbent members 80 by opening the cover 62 and visually inspecting the absorbent members. When the absorbent members 80 become saturated with oil, the can be easily removed from the interior of the housing 12 and new absorbent members can be positioned by dropping them on the screen 54. Should the screen 54 become clogged with small leaves or other particles, the operator can clean the screen by lifting the covers 62 and 64 and obtaining access to the interior chamber and the screen 54.

The separator apparatus 10 of the present invention requires little monitoring and can function for a long time without repairs or adjustments. When the job in the oilfield is complete, the apparatus 10 can be removed from the ground and transported to the new job site after the water from the housing 12 has been drained.

Many changes and modifications can be made in the design of the present invention without departing from the spirit thereof. I therefore pray that my rights to the present invention be limited only by the scope of the appended claims.

I claimed:

1. A method of separating oil from water in a water-retaining trench of an oilfield, comprising the steps of:
   providing a hollow housing defining an interior chamber, said housing having an inlet conduit;
   providing a vertical separating wall in the housing and forming a water passage channel below the separating wall, while dividing the housing into an inlet chamber and an outlet chamber, and further providing a screen extending across the interior of the housing the screen dividing the inlet chamber and the outlet chamber into respective bottom parts and upper parts;
   providing an outlet conduit having an inlet opening located above the screen in the upper part of the outlet chamber and an outlet opening directed outside of the housing;
   providing a plurality of buoyant oil-absorbing members and positioning them in the housing;
   providing a means positioned downstream from said oil-absorbing members for removing a pre-determined quantity of water from the housing;
   removably positioning the housing in the trench such that the inlet conduit rests at least in part on the bottom of the trench, while a bottom of the housing is located below the inlet conduit;
   depositing a pre-determined quantity of water in the housing so as to substantially equalize the level of liquid in the housing with a level of liquid in the trench;
   admitting trench water into the housing and causing the trench water to contact the oil-absorbing members, such that oil particles suspended in the trench water adhere to the oil-absorbing members; and
   causing substantially oil-free trench water to exit the housing.

2. The method of claim 1, further comprising the step of diverting the water removed from the housing away from the trench.

3. The method of claim 1, further comprising the step of applying a pumping action to remove the substantially oil-free trench water from the housing.

4. The method of claim 1, wherein the oil-absorbing members are positioned in the inlet chamber.

* * * * *